US007573252B1

(12) United States Patent
Griesert

(10) Patent No.: US 7,573,252 B1
(45) Date of Patent: Aug. 11, 2009

(54) SOFT-START REFERENCE RAMP AND FILTER CIRCUIT

(75) Inventor: Nathanael Griesert, Grass Valley, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 258 days.

(21) Appl. No.: 10/862,225

(22) Filed: Jun. 7, 2004

(51) Int. Cl.
*G05F 3/26* (2006.01)
(52) U.S. Cl. .......................... 323/315; 323/901; 363/49
(58) Field of Classification Search ................ 323/49, 323/901, 315, 313, 314, 316, 317, 238, 321; 327/539, 554, 132
See application file for complete search history.

(56) References Cited

U.S. PATENT DOCUMENTS

| 4,621,313 | A | * | 11/1986 | Kiteley | 363/49 |
| 5,780,904 | A | * | 7/1998 | Konishi et al. | 257/369 |
| 5,798,635 | A | * | 8/1998 | Hwang et al. | 323/222 |
| 5,861,737 | A | * | 1/1999 | Goerke et al. | 323/282 |
| 5,883,798 | A | * | 3/1999 | Yamaguchi | 363/73 |
| 5,942,934 | A | * | 8/1999 | Ngo et al. | 327/540 |
| 5,966,003 | A | * | 10/1999 | Takimoto et al. | 323/224 |
| 6,046,579 | A | * | 4/2000 | Sakurai | 323/315 |
| 6,100,677 | A | * | 8/2000 | Farrenkopf | 323/285 |
| 6,107,851 | A | * | 8/2000 | Balakirshnan et al. | 327/172 |
| 6,160,432 | A | * | 12/2000 | Rhee et al. | 327/157 |
| 6,472,928 | B1 | * | 10/2002 | Kadanka | 327/538 |
| 6,531,855 | B2 | * | 3/2003 | Miki et al. | 323/285 |
| 6,674,275 | B2 | * | 1/2004 | Darzy | 323/516 |
| 6,727,753 | B2 | * | 4/2004 | Moon | 330/253 |
| 6,871,289 | B2 | * | 3/2005 | Pullen et al. | 713/300 |
| 6,965,223 | B1 | * | 11/2005 | MacLean et al. | 323/284 |
| 6,969,977 | B1 | * | 11/2005 | Smith | 323/222 |
| 6,998,829 | B2 | * | 2/2006 | Solie | 323/288 |
| 7,002,330 | B2 | | 2/2006 | Kitani et al. | |
| 7,038,514 | B2 | * | 5/2006 | Leith et al. | 327/198 |
| 7,218,080 | B2 | * | 5/2007 | Yang | 323/222 |

* cited by examiner

*Primary Examiner*—Akm E Ullah
*Assistant Examiner*—Harry Behm
(74) *Attorney, Agent, or Firm*—Darby & Darby P.C.

(57) ABSTRACT

A method and circuit for providing a controlled ramping and filtering to a reference voltage in a regulator circuit such that an inrush current is limited and noise coupling to an output voltage is reduced. In a typical regulator circuit a soft-start and filter circuit is inserted between a feedback amplifier and a charge transfer circuit. The soft-start and filter circuit comprises a pair of transistors that are arranged to operate as a current mirror, a biasing current source determining the current drawn from the current mirror, and a soft-start capacitor shunted by a third transistor providing a conditioned reference voltage. When reference voltage rises rapidly during power-up, charging of the soft-start capacitor with constant current provides a soft-sloped conditioned reference voltage. In steady state, soft-start capacitor and a resistance of the transistor provide a first order low pass filter reducing noise that couples to the reference voltage.

20 Claims, 5 Drawing Sheets

SOFT-START REFERENCE RAMP AND FILTER CIRCUIT

FIELD OF THE INVENTION

The present invention relates to voltage regulation, and, in particular, to a circuit that provides a controlled ramping and a filtering of a reference voltage.

BACKGROUND

The function of a voltage regulator is to provide a predetermined and substantially constant output voltage in response to an unregulated input voltage. Two types of voltage regulators are commonly used including linear regulators and switching regulators.

A linear regulator typically controls the output voltage by controlling a voltage drop across a power transistor, which is connected in series with a load. The power transistor is generally operated in its linear region and conducts current continuously.

A switching regulator typically controls the output voltage by using a power transistor as a switch to provide a pulsed flow of current to a network of inductive and capacitive energy storage elements, which smooth the switched current pulses into a continuous and regulated output voltage. The power transistor may be operated either in a cutoff or saturated state at a duty cycle as needed by the voltage differential between the input and output voltages. Varying the duty cycle or frequency varies the regulated output voltage of the switching regulator.

Generally, a duty cycle of a switching regulator may be controlled by monitoring the output voltage or current through a switch. The latter type of switching regulator is known as a current-mode switching regulator, and is easier to frequency stabilize and has better response to transients than does a switching regulator in which the duty cycle is controlled directly by the output voltage.

Switching regulators have at least two advantages over linear regulators. First, switching regulators typically operate with greater efficiency than linear regulators, a particularly important factor in high current regulators. Second, switching regulators are more versatile than linear regulators. Switching regulators can provide output voltages which are less than, greater than, or of opposite polarity to the input voltage, depending on the mode of operation of the switching regulator, whereas linear regulators can only provide output voltages which are less than the input voltage.

Switching regulators, although more flexible than linear regulators in circuit applications, are typically more complex than linear regulators. Frequency control and regulation in voltage control systems for sensitive applications may have less than desirable accuracy and reliability. Especially, regulation during initial power up has proven to be difficult to control, when power supply voltages have not yet stabilized under a sudden load.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to a method and circuit for providing a controlled ramping and filtering to a reference voltage in a regulator circuit such that an inrush current is limited and noise coupling to an output voltage is reduced in a steady state.

In a voltage regulation circuit, a large inrush current may be employed, if a reference voltage $V_{ref}$ thereby, an output voltage $V_{out}$ is to be established quickly. A soft-start and filter circuit may be inserted between a feedback amplifier and a charge transfer circuit of a voltage regulator. The soft-start and filter circuit may include a pair of transistors that are arranged to operate as a current mirror, a biasing current source that is configured to determine the current drawn from the current mirror, and a soft-start capacitor that is shunted by a third transistor during shutdown and charged by a constant charging current during a power-up. The soft-start capacitor may provide a conditioned reference voltage $V_{ref}'$. When the reference voltage $V_{ref}$ rises rapidly during power-up, charging of the soft-start capacitor with the constant current provides a relatively softer slope to the conditioned reference voltage $V_{ref}'$. In steady state, the soft-start capacitor and a resistance of the transistor provide a first order low pass filter reducing noise that couples from a variety of source such as power source, reference source, and the like, to the reference voltage.

While a preferred embodiment of the present invention may be implemented in a switching voltage regulator circuit, the invention is not so limited. The described circuit may be employed as part of virtually any regulation circuit known to those skilled in the art.

Figure 1:
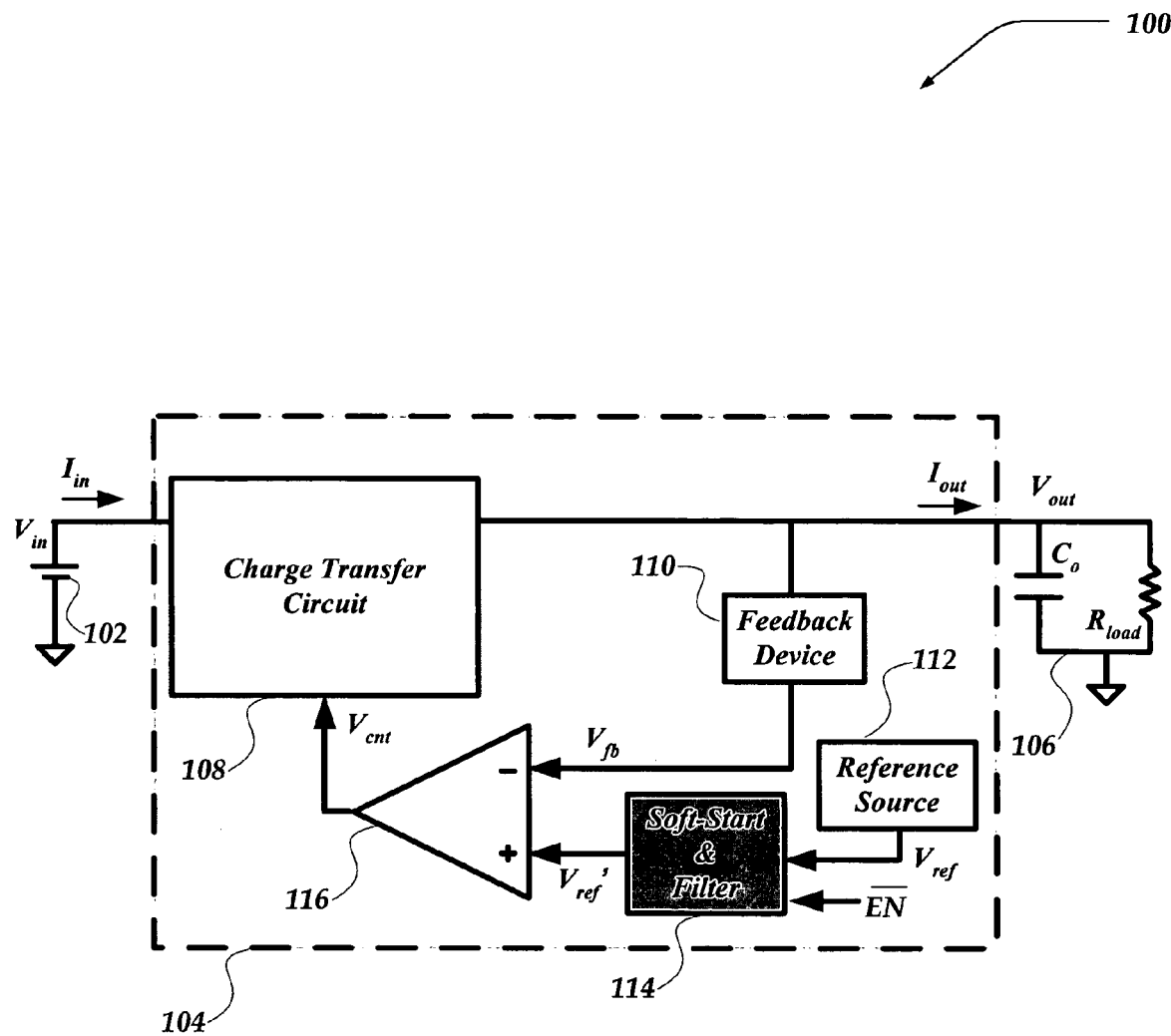
FIG. 1 illustrates a block diagram of an embodiment of a voltage regulation circuit according to the present invention.

FIG. 1 illustrates block diagram 100 of an embodiment of a voltage regulation circuit implementing the claimed invention. Block diagram 100 includes power source 102, voltage regulator 104 and load 106. In one embodiment, power source 102 may be a DC voltage supply such as a battery, and the like. The circuit may be terminated by capacitor $C_0$ and a load represented by resistor $R_{load}$.

Voltage regulator 104 is arranged to receive an input voltage $V_{in}$, and/or an input current $I_{in}$ and provide an output voltage $V_{out}$ and/or output current $I_{out}$ to load resistor $R_{load}$. Voltage regulator 104 may include charge transfer circuit 108, feedback device 110, reference source 112, soft-start and filter circuit 114, and differential amplifier 116.

Charge transfer circuit 108 is arranged to provide a regulated output signal and may include a power pass transistor, a capacitive or inductive switching circuit, and the like, as mentioned above. Feedback device 110 may include a voltage divider in one embodiment. Feedback device 110 may be arranged to provide feedback voltage $V_{fb}$ to an input of differential amplifier 116 for feedback to charge transfer circuit 108. $V_{fb}$ may be a portion of output voltage $V_{out}$. In one embodiment, a gain of feedback device 110 may be expressed as B and have a value less than about one. Reference source 112 is arranged to provide a reference to charge transfer circuit 108. As described above, $V_{ref}$ may be derived from $V_{in}$ during an initial power up. Later, in the regulation state, $V_{ref}$ may be derived from $V_{in}$, $V_{out}$, an independent source, and the like.

Soft-start and filter circuit 114 is arranged to provide $V_{ref}'$ from $V_{ref}$, and to control a ramp rate of $V_{ref}'$ for limiting an inrush current during start-up, and is further arranged to provide low pass filtering of the reference voltage to reduce noise coupling from a variety of sources. A construction and an operation of soft-start and filter circuit 114 is discussed below in conjunction with FIG. 3.

Voltage regulator 104 may start up from an initial inactive state and transition to an active state such as power-up, employment of an enable signal $\overline{EN}$, and the like. Voltage regulator 104 then transitions to a steady state, and performs voltage regulation. A load for such a regulation circuit may be characterized as a combination of capacitance and resistance. During the initial unpowered state, the capacitance may be normally discharged. When the voltage regulator is powered up and in steady state, output voltage $V_{out}$ may be a scaled value of a maximum reference voltage $V_{refmax}$. Reference voltage $V_{ref}$ may typically be derived from an input voltage $V_{in}$ during power up. In steady state, $V_{ref}$ may reach $V_{refmax}$ and be derived from $V_{in}$ or $V_{out}$ depending on a regulator design.

If reference voltage is to be established quickly during power up, a large amount of input current may be necessary. The start-up input (inrush) current may be expressed by:

$$I_{IN\_startup} G I_{OUT\_startup} = G C_o \frac{dV_o}{dt} = G C_o \frac{1}{B} \frac{dV_{ref}}{dt},$$

where G is a gain of the charge transfer circuit, $C_0$ is a load capacitance, and B is a gain of the feedback circuit that provides the combination of a portion of output voltage $V_{out}$ and reference voltage $V_{ref}$ to the charge transfer circuit.

Furthermore, noise caused by a switching circuit, power supply transients, load transients, and the like, may feed through to the reference voltage and couple via a feedback loop to output voltage $V_{out}$.

FIG. 1 shows a particular arrangement of inputs and outputs of the various components. In one embodiment, all of the components of voltage regulator 104 may be included in the same chip. Alternatively, one or more of the components of circuit 104 may be off-chip.

Figure 2:
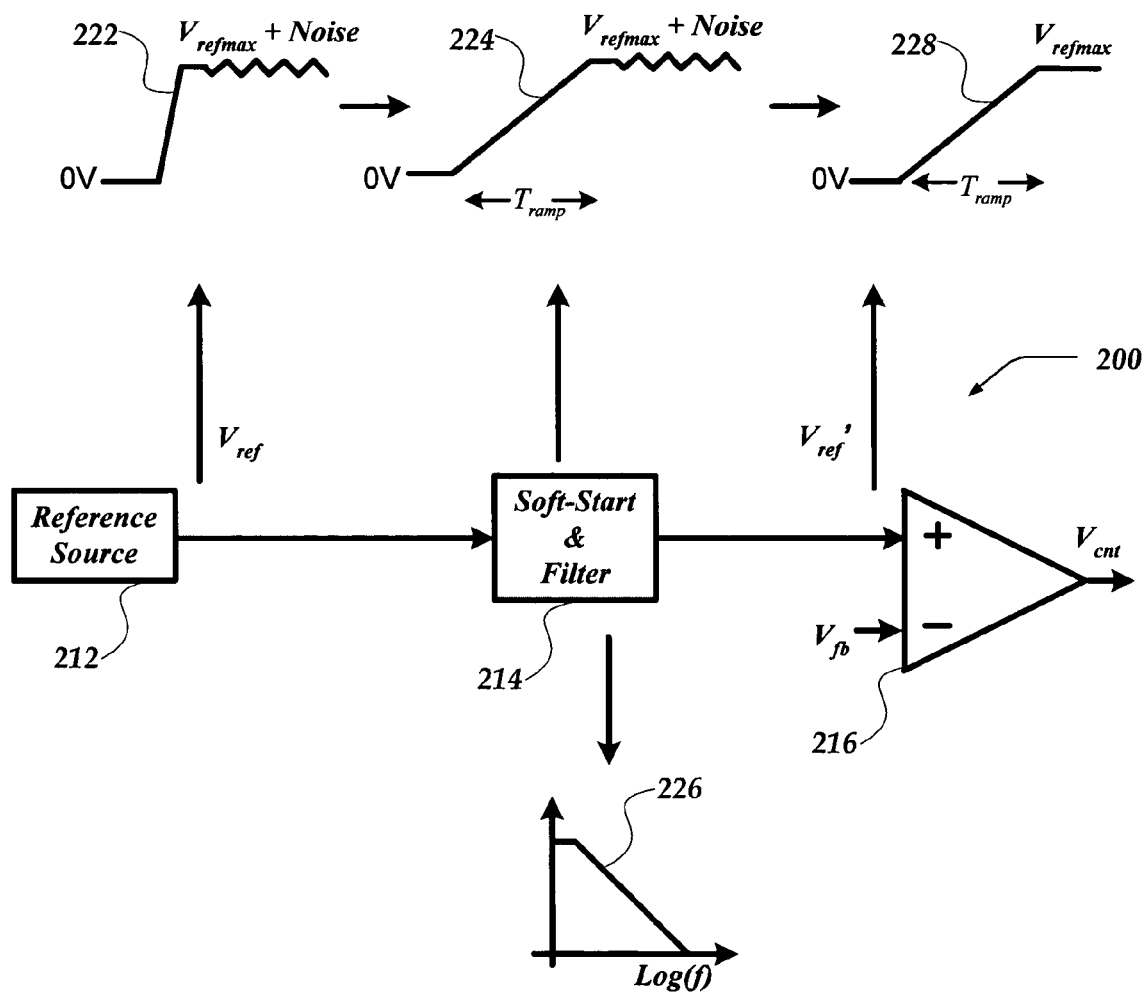
FIG. 2 illustrates an embodiment of a subcircuit of the voltage regulation circuit of FIG. 1 with accompanying voltage waveforms.

FIG. 2 illustrates an embodiment of subcircuit 200 of a voltage regulator such as voltage regulator 104 of FIG. 1 along with waveforms of voltages at each circuit block. subcircuit 200 includes reference source 212, soft-start and filter circuit 214, and differential amplifier 216. Represented waveforms include reference voltage 222 at an output of reference source 212, softened reference voltage 224 at soft-start and filter circuit 214, low-pass filter characteristic 226 of soft-start and filter circuit 214, and conditioned reference voltage 228 at an input of differential amplifier 216.

As shown in waveform 222, upon start-up the reference voltage $V_{ref}$ may transition from about 0 V to $V_{refmax}$ in a relatively short time that may be shorter than desired to sufficiently limit an inrush current. However, soft-start and filter circuit 214 may condition the reference voltage to generate a linear ramp with a substantially greater rise time $T_{ramp}$. In addition to the rise time, transients from a variety of sources such as power source, load, reference voltage source, and the like, may result in noise coupling to the reference voltage. A second function of soft-start and filter circuit 214 may include a low pass filter with a characteristic similar to that shown in filter characteristic 226. This in return may result in conditioned reference voltage $V_{ref}'$ having a shape similar to that shown in voltage representation 228 with a linear, soft rise time and reduced noise.

Figure 3:
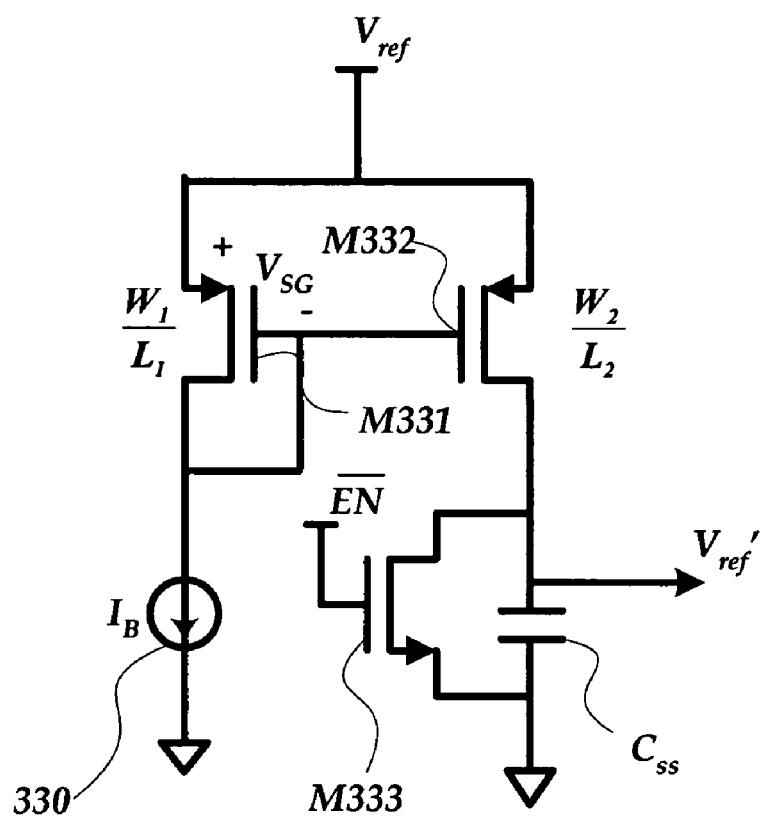
FIG. 3 schematically illustrates an embodiment of a soft-start and filter circuit that may be employed in a voltage regulation circuit.

FIG. 3 schematically illustrates an embodiment of soft-start and filter circuit 314 that may be employed in a voltage regulation circuit. Soft-start and filter circuit 314 is arranged to receive reference voltage $V_{ref}$ from a reference source such as reference source 112 of FIG. 1, and provide conditioned reference voltage $V_{ref}'$ as its output signal. Soft-start and filter circuit 314 may include transistors M331 and M332 that are arranged to operate as a current mirror. Junction areas of transistors M331 and M332 may have a predetermined ratio of $$\frac{W_1 L_1}{W_2 L_2}.$$

Current source 330 may be coupled to a drain of transistor M331 and arranged to draw biasing current $I_B$. Transistor M333 may be coupled to a drain of transistor M332 and arranged to receive an enable signal $\overline{EN}$ at its gate. A soft-start capacitor $C_{SS}$ may be coupled between a source and a drain of transistor M333. In one embodiment, transistors M331 and M332 may be PMOS type transistors, and M333 NMOS type transistor. Sources of transistors M331 and M332 are arranged to receive reference voltage $V_{ref}$.

When power is applied to the reference source, its output voltage $V_{ref}$ may rise rapidly to $V_{refmax}$ providing a supply voltage to soft-start and filter circuit 314. Transistor M333, which is arranged to discharge soft-start capacitor $C_{SS}$ during shutdown, also ceases conduction when a circuit-wide enabling signal $\overline{EN}$ is applied along with $V_{ref}$. The biasing current $I_B$ may be mirrored and scaled through transistors M331 and M332, and employed to charge soft-start capacitor $C_{SS}$. Charging $C_{SS}$ with a constant current may result in a linearly ramped, conditioned reference voltage $V_{ref}'$, where a slope of $V_{ref}'$ may be expressed as:

$$\frac{W_2 L_1}{W_1 L_2} \frac{I_B}{C_{SS}}.$$

$V_{ref}'$ may have this linear slope in the period between t=0 and t=t$_1$, where t$_1$ is a time point when $V_{ref}'$ reaches $V_{ref}$−($V_{SG}$−$V_{tp}$). At about t$_1$, transistor M332 leaves a saturation region of operation and enters a linear region of operation, where M332 operates as a resistor with an approximate value:

$$\frac{1}{K\frac{W_2}{L_2}(V_{SG} - V_{tp})},$$

where K is a transconductance parameter for M332.

Time point t$_2$ may be defined as the time point when $V_{ref}'$ exceeds 99.3% of $V_{ref}$. If time periods T$_1$ and T$_2$ are defined as T$_1$=t$_1$−0=t$_1$ and T$_2$=t$_2$−t$_1$, a total time $T_{ramp}$ for $V_{ref}'$ to transition from about 0V to about $V_{refmax}$ may be expressed as:

$$T_{ramp} \approx T_1 + T_2 = \frac{C_{SS}(V_{ref} - (V_{SG} - V_{tp}))}{\frac{W_2 L_1}{W_1 L_2} \frac{I_B}{C_{SS}}} + \frac{5 C_{SS}}{K_p \frac{W_2}{L_2}(V_{SG} - V_{tp})}.$$

Figure 4:
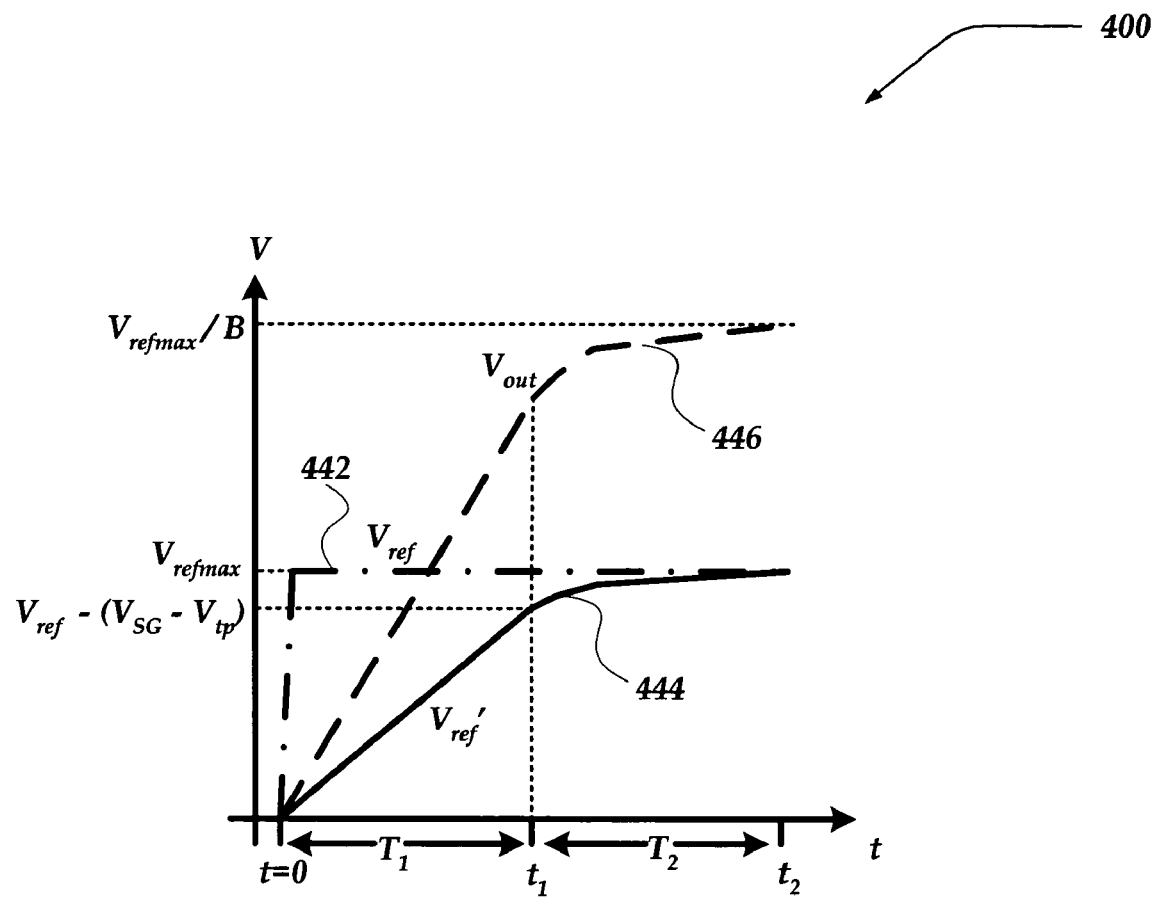
FIG. 4 illustrates a diagram of temporal changes in an output voltage of the circuit of FIG. 3.

Time points t$_1$, t$_2$, and time periods T$_1$, T$_2$ are illustrated in FIG. 4 and discussed below in conjunction with that figure. A maximum inrush current during a power-up of the regulator circuit may be directly proportional to the slope of reference voltage $V_{ref}'$. As described previously, the slope of $V_{ref}'$ in the linear region of operation (during T$_1$) may be expressed as:

$$\frac{dV_{ref}'}{dt} = \frac{W_2 L_1}{W_1 L_2} \frac{I_B}{C_{SS}}.$$

Because, $V_{ref}'$ replaces $V_{ref}$ as the regulator circuit's reference voltage at the input of a next stage differential amplifier, a maximum start-up input current may be expressed as:

$$I_{IN\_startup\_max} = GC_o \frac{1}{B} \frac{dV_{ref}'}{dt} = GC_o \frac{1}{B} \frac{W_2 L_1}{W_1 L_2} \frac{I_B}{C_{SS}},$$

when there is no load coupled to the output ($I_{load}$=0).

Once $V_{ref}'$ reaches $V_{refmax}$, soft-start and filter circuit 314 may provide steady state voltage $V_{refmax}$ to the next stage differential amplifier such as differential amplifier 116, and operate as a first order low pass filter. A resistance of transistor M332 in the linear region of operation coupled in series with soft-start capacitor $C_{SS}$ may operate as the first order low pass filter with a roll-off frequency:

$$F_{LPF} = \frac{K\frac{W_2}{L_2}(V_{SG} - V_{tp})}{2\pi C_{SS}}.$$

Thus, the roll-off frequency of the low-pass filter can be rewritten as $$\frac{K\frac{W_2}{L_2} V_{SAT}}{2\pi C_{SS}},$$

where $V_{SAT}$ is a saturation voltage of the second transistor.

FIG. 4 illustrates voltage diagram 400 comparing reference voltage $V_{ref}$ with output voltage $V_{out}$ and conditioned reference voltage $V_{ref}'$ of soft-start and filter circuit 314 of FIG. 3.

A vertical axis of voltage diagram 400 represents voltage (V). A horizontal axis represents time (t). Voltage diagram 400 illustrates three waveforms including waveform 442 representing reference voltage $V_{ref}$, waveform 444 representing conditioned reference voltage $V_{ref}'$, and waveform 446 representing output voltage $V_{out}$.

All three voltages begin at t=0. As described previously, reference voltage $V_{ref}$ rises rapidly reaching steady state value $V_{refmax}$ in a relatively short time that may be shorter than desired to sufficiently limit an inrush current. Waveform 444 representing conditioned reference voltage $V_{ref}'$, on the other hand, may rise with a substantially softer slope in a linear region of operation. The linear region of operation may be a time period between t=0 and t=t$_1$, when $V_{ref}'$ reaches $V_{ref}$−($V_{SG}$−$V_{tp}$). A second region for curve 444 may be defined between t$_1$ and t$_2$, which represents a time point when $V_{ref}'$ exceeds 99.3% of $V_{ref}$.

Waveform 446 representing $V_{out}$ may be derived from $V_{ref}'$ employing a linear relationship based, in part, on a gain of a differential amplifier and a feedback circuit of the voltage regulator. In one embodiment, the feedback circuit may have a gain of B. In this case, regulated output voltage $V_{out}$ may approach $$\frac{V_{refmax}}{B}$$

in steady state.

Figure 5:
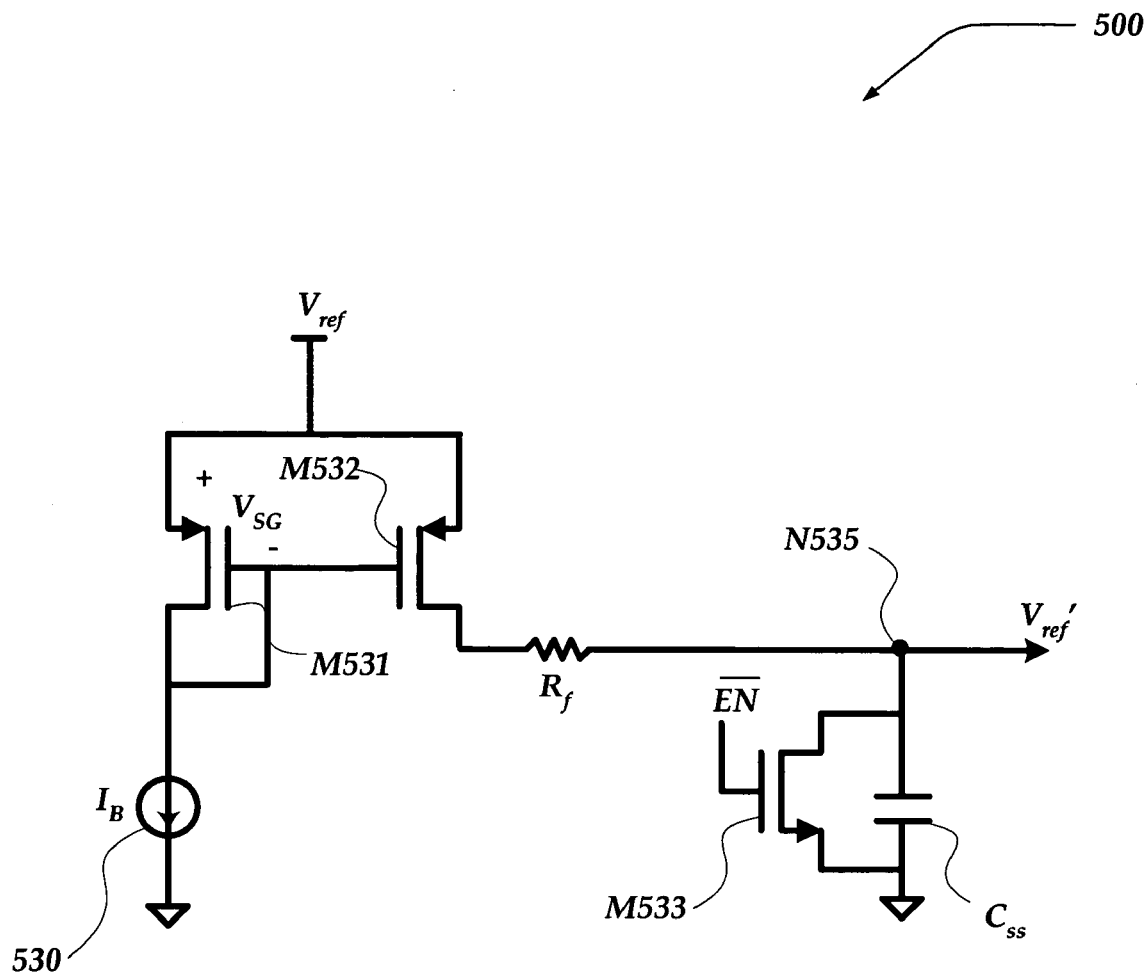
FIG. 5 schematically illustrates another embodiment of a soft-start and filter circuit that may be employed in a voltage regulation circuit.

FIG. 5 schematically illustrates another embodiment of soft-start and filter circuit 500 that may be employed in a voltage regulation circuit.

Soft-start and filter circuit 500 includes transistors M531 and M532 that are configured to operate as a current mirror, current source 530, transistor M533, soft-start capacitor $C_{SS}$, and filter resistor $R_f$. Soft-start and filter circuit 500 is arranged to operate essentially the same way as soft-start and filter circuit 314 of FIG. 3. Reference voltage $V_{ref}$ is supplied to the circuit at sources of current mirror transistors M531 and M532. Conditioned reference voltage $V_{ref}'$ is provided at node N535 between $R_f$ and a drain of transistor M533.

One difference between soft-start and filter circuit 314 and 500 is the addition of filter resistor $R_f$. $R_f$ is configured to operate as an additional parameter in determining a roll-off frequency of the low-pass filter. Particularly, if M533 is selected to be a PMOS type transistor, a resistance of $R_f$ may be desired for a reasonable frequency range. In one embodiment, the resistance of $R_f$ may range from about 1 kiloohms to about 10 megaohms.

The above specification, examples and data provide a description of the manufacture and use of the composition of the invention. Since many embodiments of the invention can be made without departing from the spirit and scope of the invention, the invention also resides in the claims hereinafter appended.

I claim:

1. A circuit for providing controlled ramping and filtering, comprising:
   a voltage regulator controller, including:
      a current mirror circuit that is arranged to receive a reference voltage and to provide a charging current from a biasing current, wherein the current mirror circuit includes a first and a second transistor having sources receiving said reference voltage;
      a soft-start capacitor circuit that is arranged to provide a conditioned reference voltage based, in part, on the charging current, wherein the soft-start capacitor circuit is coupled to the second transistor, and wherein the soft-start capacitor circuit is arranged such that the conditioned reference voltage is substantially stable during a steady state and such that the conditioned reference voltage substantially tracks the reference voltage during the steady state;
      a switch circuit comprising a transistor, wherein the switch circuit is arranged to receive a switch control signal, and wherein the switch circuit is arranged to shunt the charging current away from the soft-start capacitor circuit, if the switch control signal corresponds to an inactive level, and further arranged to enable the soft-start capacitor circuit to be charged, if the switch control signal corresponds to an active level; and
      a differential amplifier that is arranged to receive a feedback voltage that is based at least, in part, on a regulated output voltage; to receive the conditioned reference voltage;
   and to, during all operating states, compare the conditioned reference voltage with the feedback voltage.

2. The circuit of claim 1, wherein junction areas of the first and the second transistors have a ratio of $$\frac{W_1 L_1}{W_2 L_2},$$

and wherein the junction area ratio determines a ratio of the charging current to the biasing current.

3. The circuit of claim 2, wherein a value of the biasing current is $I_B$ and a capacitance of the soft-start capacitor circuit is $C_{SS}$, and wherein a slope of the conditioned reference voltage is $$\frac{W_2 L_1}{W_1 L_2} \frac{I_B}{C_{SS}}.$$

4. The circuit of claim 1, further comprising a current source circuit that is arranged to provide the biasing current to the first transistor such that the charging current is provided to the soft-start capacitor circuit, if the switch control signal changes to an active level.

5. The circuit of claim 1, wherein the transistors include at least one of a PMOS FET and an NMOS FET.

6. The circuit of claim 1, further comprising a filtering resistor coupled between the soft-start capacitor circuit and the second transistor.

7. The circuit of claim 6, wherein a value of the filtering resistor ranges between about one kiloohms and about ten megaohms.

8. The circuit of claim 1, wherein the switch circuit is arranged to be opened and closed in response to a global enable signal.

9. The circuit of claim 1, wherein a resistance of the second transistor and a capacitance of the soft-start capacitor circuit are arranged to operate as a first-order low-pass filter in a steady state.

10. The circuit of claim 9, wherein a transconductance parameter of the second transistor is K, a width and a length of a junction area of the second transistor are $W_2$ and $L_2$, a saturation voltage of the second transistor $V_{SAT}$, a capacitance of the soft-start capacitor circuit is $C_{SS}$, and wherein a roll-off frequency of the low-pass filter is $$\frac{K \frac{W_2}{L_2} V_{SAT}}{2\pi C_{SS}}.$$

11. The circuit of claim 1, wherein the voltage regulator controller further includes:
   a charge transfer circuit that is arranged to provide the regulated output voltage in response to an input voltage and a control voltage, wherein the control voltage is provided by the differential amplifier, and wherein the differential amplifier is an error amplifier; and
   a reference source that is arranged to provide the reference voltage.

12. The circuit of claim 11, wherein the soft-start capacitor circuit is arranged such that a rise time of the regulated output voltage is determined based, in part, on a capacitance value that is associated with the soft-start capacitor circuit.

13. The circuit of claim 11, wherein the soft-start capacitor circuit is arranged such that a rise time of the conditioned reference voltage is determined, based in part, on the charging current from the current mirror circuit, and a width and a length of junction areas of the first and second transistors.

14. The circuit of claim 11, wherein the second transistor and the soft-start capacitor circuit are arranged to operate together as a low-pass filter in a steady state when the soft-start capacitor circuit is charged.

15. The circuit of claim 14, wherein the second transistor and the soft-start capacitor circuit are arranged such that a roll-off frequency of the low-pass filter is determined, in part, by a transconductance parameter and a junction area of the second transistor, and a capacitance of the soft-start capacitor circuit.

16. The circuit of claim 11, wherein the soft-start capacitor circuit includes at least one capacitor.

17. The circuit of claim 1, wherein the voltage regulator controller is arranged such that the switch control signal corresponds to an inactive level during a shutdown mode.

18. A circuit for soft-started ramping and filtering, comprising:
   a means for providing a regulated input voltage at an output, including:
      a current mirror that is arranged to receive a reference voltage at sources of first and second transistors of a current mirror and to provide a charging current;
      a means for providing a conditioned reference voltage based, in part, on the charging current such that a rise time of the conditioned reference voltage is substantially greater than a rise time of the reference voltage, and such that a noise component of the reference voltage is filtered, such that the conditioned reference voltage is substantially stable during a steady state, and such that the conditioned reference voltage substantially tracks the reference voltage during the steady state;

a means for providing the reference voltage to the means for providing a conditioned reference voltage;

a means for providing the charging current to the means for providing a conditioned reference voltage, if a switch control signal changes to an active level, said charging current independent of the regulated input voltage at said output;

a means for filtering a noise component of the reference voltage in a steady state when the means for providing a conditioned reference voltage is charged; and a means for comparing, during all operating states, the conditioned reference voltage with a feedback voltage, wherein the feedback voltage is based at least, in part, on the regulated input voltage at said output.

19. A method for providing controlled ramping and filtering, comprising:

regulating an output voltage, wherein regulating the output voltage includes:

receiving a reference voltage at sources of a first and second transistor of a current mirror;

providing a charging current from the current mirror;

if a switch control signal corresponds to an active level, charging a soft-start capacitor circuit with the charging current; and if the switch control signal corresponds to an inactive level, shunting the charging current away from the soft-start capacitor circuit;

providing a conditioned reference voltage, such that a rise time of the conditioned reference voltage is greater than a rise time of the reference voltage, such that a noise component of the reference voltage is less than a noise component of the conditioned reference voltage, such that the conditioned reference voltage is substantially stable during a steady state, and such that the conditioned reference voltage substantially tracks the reference voltage during the steady state; and comparing, during all operating states, the conditioned reference voltage with a feedback voltage, wherein the feedback voltage is based at least, in part, on a regulated output voltage.

20. The method of claim 19, wherein regulating the voltage further includes:

combining the conditioned reference voltage with a feedback voltage to provide an error voltage in a voltage regulator circuit, such that the error voltage is used to control the output voltage such that an inrush power-up current is reduced.

* * * * *

UNITED STATES PATENT AND TRADEMARK OFFICE
CERTIFICATE OF CORRECTION

PATENT NO. : 7,573,252 B1
APPLICATION NO. : 10/862225
DATED : August 11, 2009
INVENTOR(S) : Nathanael Griesert Page 1 of 1

It is certified that error appears in the above-identified patent and that said Letters Patent is hereby corrected as shown below:

In column 4, line 6, delete "sub-" and insert -- Sub- --, therefor.

In column 8, line 15, in claim 10, delete " $\dfrac{K \dfrac{W_2}{L_2} V_{SAT}}{2\pi C_{SS}}$ " and insert -- $\dfrac{K \dfrac{W_2}{L_2} V_{SAT}}{2\pi C_{SS}}$ --, therefor.

Signed and Sealed this

Sixth Day of April, 2010

David J. Kappos
*Director of the United States Patent and Trademark Office*